US 8,333,441 B2

(12) United States Patent
Lovell et al.

(10) Patent No.: US 8,333,441 B2
(45) Date of Patent: Dec. 18, 2012

(54) MOTOR VEHICLE BRAKING SYSTEM AND METHOD

(75) Inventors: Steven Randall Lovell, Fort Wayne, IN (US); Lawrence D. Hasfjord, Chillicothe, IL (US); David Bowers, Fort Wayne, IN (US); Byron Dunham, Haviland, OH (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 794 days.

(21) Appl. No.: 12/503,098

(22) Filed: Jul. 15, 2009

(65) Prior Publication Data

US 2011/0015038 A1    Jan. 20, 2011

(51) Int. Cl.
    *G06F 17/00*      (2006.01)
(52) U.S. Cl. ............................................. 303/3; 701/70
(58) Field of Classification Search .............. 303/3, 15, 303/20, 122.09; 701/53, 70–72
See application file for complete search history.

(56) References Cited

U.S. PATENT DOCUMENTS

| 6,536,408 | B1 | 3/2003 | Warner |
| 6,819,995 | B2 * | 11/2004 | Bellinger ......................... 701/53 |
| 6,820,728 | B2 * | 11/2004 | Raad .............................. 188/267 |
| 7,393,065 | B2 * | 7/2008 | Craig et al. ............... 303/122.09 |
| 7,739,021 | B2 * | 6/2010 | Wegeng et al. .................. 701/70 |
| 2010/0025167 | A1 * | 2/2010 | Staub et al. .................... 188/156 |

* cited by examiner

*Primary Examiner* — Christopher Schwartz
(74) *Attorney, Agent, or Firm* — Jeffrey P. Calfa; Mark C. Bach

(57) ABSTRACT

A motor vehicle (12) has a chassis (16) with wheels (26, 34) on which the motor vehicle travels, a powertrain having an engine (20) coupled to at least one of the wheels, a primary brake system (38) for braking the motor vehicle via foundation brakes at the wheels, and a secondary brake system for braking the vehicle via at least one powertrain brake mechanism (57) that can apply brake torque to at least one of the wheels to which the powertrain is coupled. The primary brake system has a mechanical operator (40) that when operated by a driver causes pressure to be created in the primary brake system for operating the foundation brakes to apply brake torque correlated with magnitude of the pressure. A device (42) signals a controller (44) that the foundation brakes are being applied. A selector (58) available to the driver signals the controller for selectively enabling use of the secondary brake system in conjunction with the primary brake system.

7 Claims, 2 Drawing Sheets

MOTOR VEHICLE BRAKING SYSTEM AND METHOD

TECHNICAL FIELD

This disclosure relates generally to motor vehicle braking systems and methods. More particularly, this disclosure relates to a motor vehicle that, in addition to having service brakes at individual road wheels, have one or more mechanisms that are associated with their powertrains and that when operated while the vehicle is moving, can decelerate the vehicle independently of the service brakes.

BACKGROUND OF THE DISCLOSURE

A motor vehicle, especially a large one like a heavy truck or highway tractor, may be equipped with one or more mechanisms in its powertrain that when operated can apply a load on the powertrain for decelerating the vehicle. Any controllable device or mechanism that will produce drivetrain losses resulting in vehicle deceleration can serve as a retarder during certain operating conditions. Examples of such mechanisms are devices like exhaust brakes, engine brakes, and driveline or transmission retarders. Downshifting of a transmission can also decelerate a vehicle. An engine cooling fan that can be selectively connected to and disconnected from the engine could be used as a retarder during certain conditions. Still other devices and mechanisms include air intake throttle valves, electrical loads, and energy storage devices that are not associated with hybrid vehicle operation.

Large motor vehicles typically have service, or foundation, brakes at individual road wheels, and those wheel brakes are the primary means for decelerating the vehicle. Wheel brakes that apply friction forces to rotating wheels create torque that opposes wheel rotation. That torque creates forces at the interfaces between the wheels' tires and road surface opposing the direction of vehicle motion, thereby decelerating the vehicle. However, the friction forces that act on the rotating road wheels generate heat that raises brake temperature. The heat and wear created by numerous applications of the service brakes eventually degrade the effectiveness of brake linings or brake pads, necessitating their replacement.

SUMMARY OF THE DISCLOSURE

One embodiment of a motor vehicle braking system for use on a motor vehicle comprising a chassis comprising road wheels on which the motor vehicle travels, a powertrain comprising an engine that is coupled to at least one of the road wheels for propelling the motor vehicle, a primary brake system for braking the motor vehicle via foundation brakes at the road wheels, a secondary brake system for braking the motor vehicle via at least one powertrain brake mechanism that applies brake torque to the at least one of the road wheels to which the powertrain is coupled, the primary brake system comprising a mechanical operator that when operated by a driver of the motor vehicle causes pressure to be created in the primary brake system for operating the foundation brakes to apply brake torque correlated with magnitude of the pressure, a device for signaling a controller that the foundation brakes are being applied, the motor braking system comprises a selector available to the driver of the motor vehicle for signaling the controller to selectively enable use of the secondary brake system in conjunction with the primary brake system to brake the motor vehicle.

Another embodiment provides a method for braking a motor vehicle that comprises a chassis comprising road wheels on which the vehicle travels, a powertrain comprising an engine that is coupled to at least one of the road wheels for propelling the motor vehicle, a primary brake system for braking the motor vehicle via foundation brakes at the road wheels, a secondary brake system for braking the motor vehicle via at least one powertrain brake mechanism that can apply brake torque to at least one of the road wheels to which the powertrain is coupled, a mechanical operator that when operated by a driver of the motor vehicle causes pressure to be created in the primary brake system for operating the foundation brakes to apply brake torque correlated with magnitude of the pressure, a device for signaling a first controller that the foundation brakes are being applied, and a selector available to the driver of the motor vehicle for signaling the first controller to selectively enable use of the secondary brake system in conjunction with the primary brake system to brake the motor vehicle. The method comprises the step of causing the first controller to enable a second controller that controls operation of the secondary brake system to apply brake torque to the powertrain concurrent with brake torque being applied by the primary brake system and in relation to the brake torque being applied by the primary brake system as set by the selector when the selector is signaling the first controller to selectively enable use of the secondary brake system.

DETAILED DESCRIPTION

Figure 1:
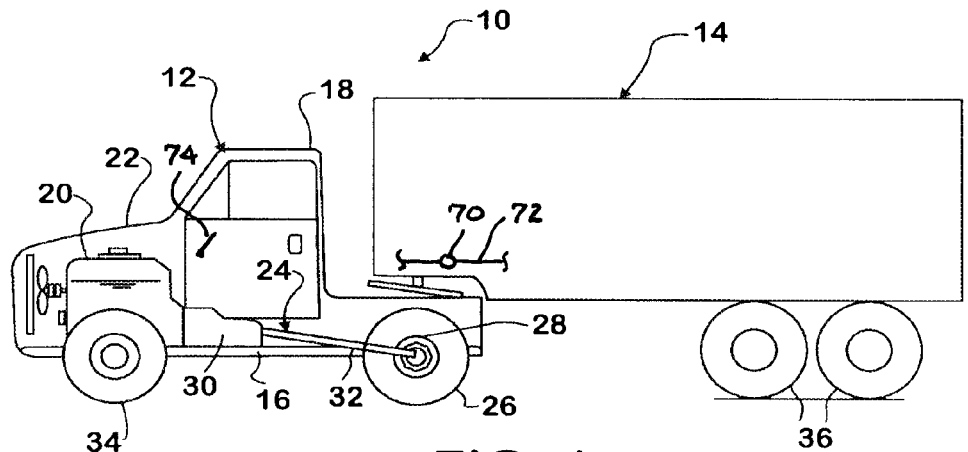
FIG. 1 shows a tractor-trailer in side elevation view.

FIG. 1 shows a tractor-trailer 10 comprising a highway tractor 12 and a trailer 14 that is being towed by the tractor. Tractor 12 comprises a chassis 16 on which a cab 18 is centrally mounted. An engine 20, such as a diesel engine, is mounted on chassis 16 and housed within an engine compartment 22 forwardly of cab 18. A drivetrain 24 couples engine 20 with driven rear road wheels 26 on a rear axle 28 that is suspended from chassis 16. Drivetrain 24 comprises a transmission 30 coupled to engine 20 and a driveshaft 32 that couples the transmission to axle 28. Collectively, engine 20, transmission 30, driveshaft 32, and axle 28 comprise the powertrain of tractor 12. When transmission 30 is in a drive gear, engine 20 is mechanically coupled to road wheels 26.

Tractor 12 comprises wheel brakes at rear wheels 26 and also at steered front wheels 34. The rear of trailer 14 is supported on an underlying road surface via a bogie containing tandem wheels 36 on each side. Wheel brakes are also associated with wheels 36.

Figure 2:
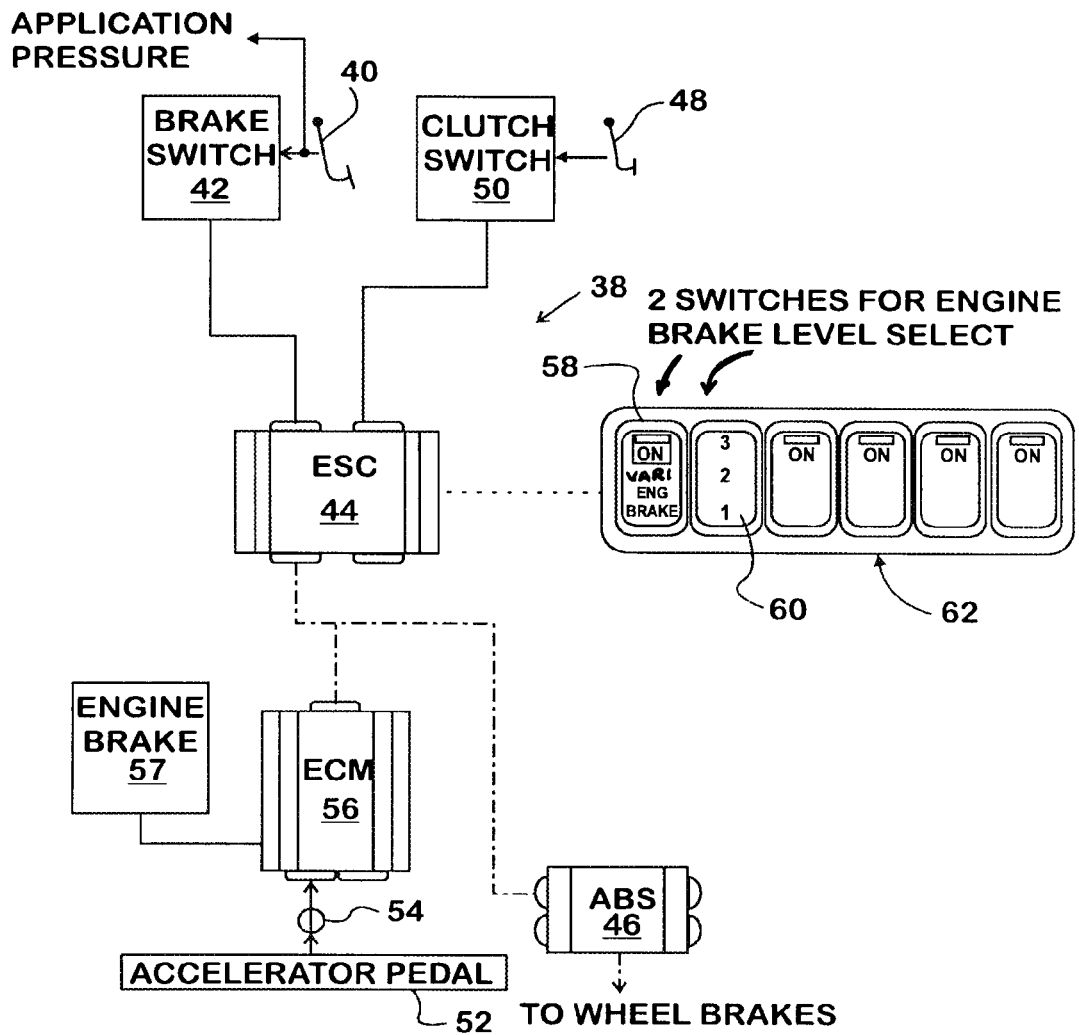
FIG. 2 is a general schematic diagram of portions of the tractor-trailer.

FIG. 2 shows some elements of a service brake system 38 of tractor 12. Those elements include a foot-operated brake pedal 40 that is disposed within cab 18 to be depressed by the foot of a driver of the tractor to apply the service brakes at wheels 26, 34, 36. The brake mechanisms typically comprise drum- and/or disc-brakes that are applied either hydraulically or pneumatically to brake the wheels by friction. System 38 may have a power booster that reduces the force that a driver might otherwise have to exert when depressing brake pedal 40.

Depression of pedal 40 operates a switch 42 to send a signal to an electronic systems controller (ESC) 44 in tractor 12 while the force being applied to pedal 40 creates application pressure that operates the foundation brakes to apply brake torque correlated with magnitude of the pressure. System 38 also has ABS system 46 that interacts with application of the foundation brakes to avoid wheel lock.

If transmission 30 is a manually shifted one, a foot-operated clutch pedal 48 is disposed within cab 18 to be depressed by the foot of a driver of the tractor to disengage the clutch and consequently uncouple the transmission input from the engine output to allow the transmission to be shifted by the driver from one gear to another. Depression of clutch pedal 48 operates a switch 50 to send a signal to controller 44 indicating that the transmission has been disengaged.

A foot-operated accelerator pedal 52 is disposed within cab 18 to be depressed by the foot of a driver to accelerate tractor 12 by operating a sensor 54 that provides a signal to an engine control module 56 indicating the extent to which the accelerator pedal is being depressed. Module 56 causes engine 20 to accelerate the vehicle in accordance with the sensor signal.

Application and release of a powertrain brake mechanism, such as an engine brake 57, is controlled by module 56 in response to corresponding requests from controller 44 in coordination with operation of transmission 30 and ABS system 46 when appropriate.

Control settings for how engine brake 57 is operated by controller 44 are provided by control devices, such as switches 58, 60 in a control panel 62 that is inside cab 16.

Switch 58 is a three-position rocker switch that can be placed in any one of ON, VARIABLE, and OFF positions. When placed in OFF position, switch 58 disallows engine brake 57 from being operated when brake pedal 40 is depressed to apply the service brakes. With switch 58 in ON position when brake pedal 40 is depressed to apply the service brakes, engine brake 57 is requested to brake the vehicle up to a limit set by switch 60.

Switch 60 is a three-position switch. In each position, switch 60 selects a particular percentage of the total vehicle braking that is being requested to be applied by powertrain braking. For example in setting "1", the powertrain brake is requested to apply braking up to a limit of 33% of total vehicle braking, in setting "2", 66%, and in setting "3", 100%. The particular percentages are end user programmable and may be set to values other than the ones just given as the example.

Actual application of the powertrain brake and the actual amount of its contribution to total vehicle braking up to the limit set by switch 60 is controlled by ECM 56. In other words, switches 58 and 60 simply make requests for the powertrain brake to contribute to vehicle braking which ECM may or may not honor. To the extent that a request is honored, the service brakes provide the remainder of the total vehicle braking.

Figure 3:
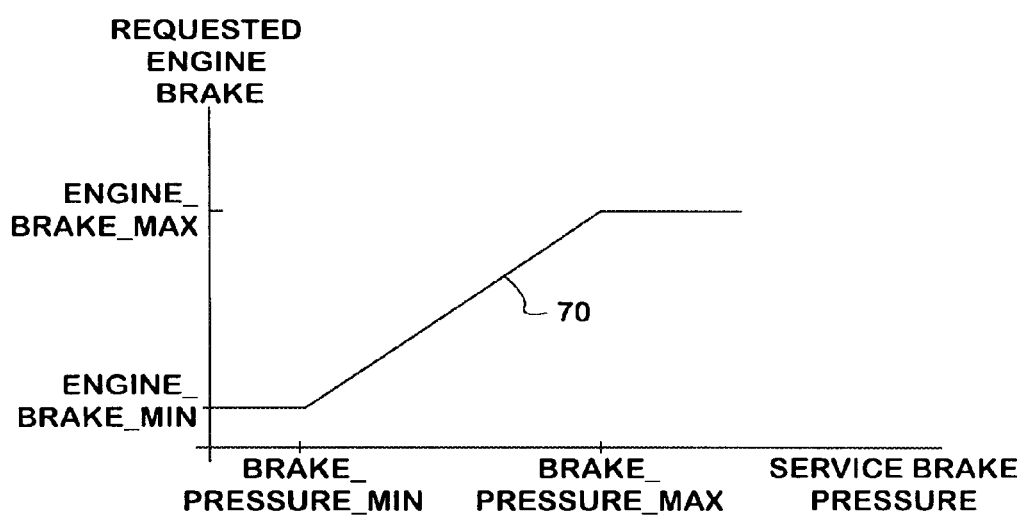
FIG. 3 is a graph plot of certain relationships

When switch 58 is set to VARIABLE, the powertrain's requested share of total vehicle braking is based on a relationship shown by the graph plot 70 in FIG. 3. A parameter Service_Brake_Pressure represents application pressure being applied by brake pedal 40. The value for a parameter Requested_Engine_Brake (here assuming that the powertrain brake is an engine brake) is related to Service_Brake_Pressure by graph plot 70. For values of Service_Brake_Pressure equal to or less than a value Brake_Pressure_Min, the value for Requested_Engine_Brake is Engine_Brake_Min. For values of Service_Brake_Pressure equal to or greater than a value Brake_Pressure_Max, the value for Requested_Engine_Brake is Engine_Brake_Max. For values of Service_Brake_Pressure greater than Brake_Pressure_Min but less than Brake_Pressure_Max, the value for Requested_Engine_Brake increases from Engine_Brake_Min. linearly with increasing Service_Brake_Pressure from Brake_Pressure_Min.

Instead of a relationship like that shown in FIG. 3, powertrain braking may be requested by correlating the request in terms of braking power correlated with applied brake pressure.

Powertrain braking power is correlated with brake application pressure obtained while the driver depresses brake pedal 40. If ECM 56 honors an entire request from ESC 44, it operates the powertrain brake to maintain a constant level of braking power regardless of engine speed or vehicle speed or any other aspect of secondary (i.e., non-wheel brake) braking. If a request exceeds the capability of the powertrain brake, the powertrain brake will apply braking to the extent of its capability.

The following table is on example of brake application pressure to secondary braking power.

| Brake Application Pressure | Secondary Braking Power |
|---|---|
| 5 psi | 25 hp |
| 10 psi | 50 hp |
| 15 psi | 75 hp |
| 20 psi | 100 hp |

If the driver depresses brake pedal 40 to an obtained pressure of 15 psi (pounds per square inch) and maintains that constant pressure as the vehicle slows, the powertrain brake will compensate for engine speed changes in order to maintain a constant 75 hp (horsepower) secondary braking effort.

An air application pressure sensor 70 in FIG. 1 may be used to determine an amount of powertrain braking. Such a sensor may be installed in an air line 72 to the brakes at trailer wheels 36 which is "OR'd" with the usual primary and secondary air systems via a check valve such that the trailer brakes would be expected to receive air pressure even if one of the air systems were to fail.

This installation of the sensor 70 in the trailer brake air line 72 adds a functionality benefit. Some drivers use a hand brake 74 (or trailer brake) in FIG. 1 instead of the tractor's service brakes in order to save the tractor brakes. Powertrain braking can occur without depressing brake pedal 40 because the hand brake 74 adds air pressure to the trailer brake line independently of the service brakes. In essence, the driver is controlling trailer brake and also requesting powertrain braking via the hand brake 74.

ECM 56 may have a parameter for selecting use of a particular powertrain brake, and for accepting a request from switches 58 and 60 upon release of accelerator pedal 52 instead of or in addition to depression of brake pedal 40.

What is claimed is:

1. A motor vehicle comprising:
   a chassis comprising road wheels on which the motor vehicle travels,
   a powertrain comprising an engine that is coupled to at least some of the road wheels for propelling the motor vehicle,
   a primary brake system for braking the motor vehicle via foundation brakes at the road wheels,
   a secondary brake system for braking the motor vehicle via at least one powertrain brake mechanism that can apply brake torque to road wheels to which the powertrain is coupled,
   the primary brake system comprising a mechanical operator that when operated by a driver of the motor vehicle causes pressure to be created in the primary brake system for operating the foundation brakes to apply brake torque correlated with magnitude of the pressure, a controller, a device for signaling the controller that the foundation brakes are being applied, a selector available to a driver of the motor vehicle for signaling the controller to selectively enable use of the secondary brake system in conjunction with the primary brake system to brake the motor vehicle, and in which the controller, when the device is signaling that the foundation brakes are being applied and the selector is set to signal enablement of use of the secondary brake system, is effective to issue a request to the secondary brake system to contribute to braking the motor vehicle in accordance with a setting of the selector by the driver and the magnitude of the pressure in the primary brake system, the selector comprises a first switch for selectively enabling use of the secondary brake system in conjunction with the primary brake system to brake the motor vehicle and a second switch for selecting a quantity of motor vehicle braking that the secondary brake system is enabled to contribute to total motor vehicle braking, in which the second switch is selectively operable for selecting the quantity of motor vehicle braking that the secondary brake system is enabled to contribute to total motor vehicle braking in correlation with the magnitude of the pressure in the primary brake system according to a relationship wherein the quantity of motor vehicle braking that the secondary brake system is enabled to contribute to total motor vehicle braking increases with increasing pressure in the primary brake system over a range of increasing pressure in the primary brake system extending from a minimum brake pressure to a brake pressure limit with the quantity of motor vehicle braking that the secondary brake system is enabled to contribute to total motor vehicle braking ceasing to increase for pressure in the primary brake system greater than the brake pressure limit.

2. The motor vehicle set forth in claim 1 in which the device is a brake pedal switch.

3. The motor vehicle set forth in claim 1 in which the device is an accelerator pedal switch.

4. A motor vehicle comprising:

a chassis comprising road wheels on which the motor vehicle travels, a powertrain comprising an engine that is coupled to at least some of the road wheels for propelling the motor vehicle, a primary brake system for braking the motor vehicle via foundation brakes at the road wheels, a secondary brake system for braking the motor vehicle via at least one powertrain brake mechanism that can apply brake torque to road wheels to which the powertrain is coupled, the primary brake system comprising a mechanical operator that when operated by a driver of the motor vehicle causes pressure to be created in the primary brake system for operating the foundation brakes to apply brake torque correlated with magnitude of the pressure, a controller, a device for signaling the controller that the foundation brakes are being applied, a selector available to a driver of the motor vehicle for signaling the controller to selectively enable use of the secondary brake system in conjunction with the primary brake system to brake the motor vehicle, and in which the controller, when the device is signaling that the foundation brakes are being applied and the selector is set to signal enablement of use of the secondary brake system, is effective to issue a request to the secondary brake system to contribute to braking the motor vehicle in accordance with a setting of the selector by the driver and the magnitude of the pressure in the primary brake system, the selector comprises a first switch for selectively enabling use of the secondary brake system in conjunction with the primary brake system to brake the motor vehicle and a second switch for selecting a quantity of motor vehicle braking that the secondary brake system is enabled to contribute to total motor vehicle braking in which the second switch is selectively operable for selecting the quantity of motor vehicle braking that the secondary brake system is enabled to contribute to total motor vehicle braking as braking power that correlates with the magnitude of the pressure in the primary brake system according to a relationship wherein the quantity of motor vehicle braking that the secondary brake system is enabled to contribute to total motor vehicle braking increases with increasing pressure in the primary brake system over a range of increasing pressure in the primary brake system extending from a minimum brake pressure to a brake pressure limit with the quantity of motor vehicle braking that the secondary brake system is enabled to contribute to total motor vehicle braking ceasing to increase for pressure in the primary brake system greater than the brake pressure limit.

5. The motor vehicle set forth in claim 4 in which the device is a brake pedal switch.

6. The motor vehicle set forth in claim 4 in which the device is an accelerator pedal switch.

7. A motor vehicle and a trailer which is towed by the motor vehicle, the motor vehicle comprising a chassis comprising road wheels on which the motor vehicle travels, a powertrain comprising an engine that is coupled to at least some of the road wheels for propelling the motor vehicle, a primary brake system for braking the motor vehicle via foundation brakes at the road wheels, a secondary brake system for braking the motor vehicle via at least one powertrain brake mechanism that can apply brake torque to road wheels to which the powertrain is coupled, a controller, the primary brake system comprising a mechanical operator that when operated by a driver of the vehicle causes pressure to be created in the primary brake system for operating the foundation brakes to apply brake torque to the road wheels, a selector available to a driver of the vehicle for signaling the controller to selectively enable use of the secondary brake system in conjunction with the primary brake system to brake the motor vehicle, the trailer comprising trailer wheels on which the trailer travels and trailer wheel brakes at the trailer wheels, the motor vehicle comprising a hand brake operable by the driver of the motor vehicle, and the controller being effective when the selector is set to signal enablement of use of the secondary brake system and the hand brake is operated to issue a request to the secondary brake system to contribute to braking the motor vehicle in accordance with a setting of the selector by the driver of the motor vehicle and the magnitude of pressure sensed by a pressure sensor that senses the magnitude of pressure in a line of the primary brake system in the trailer leading to the trailer wheel brakes.

* * * * *